Aug. 18, 1925.  
W. D. DEWEND  
DISK HARROW  
Filed April 15, 1924  
1,550,061  
3 Sheets-Sheet 1
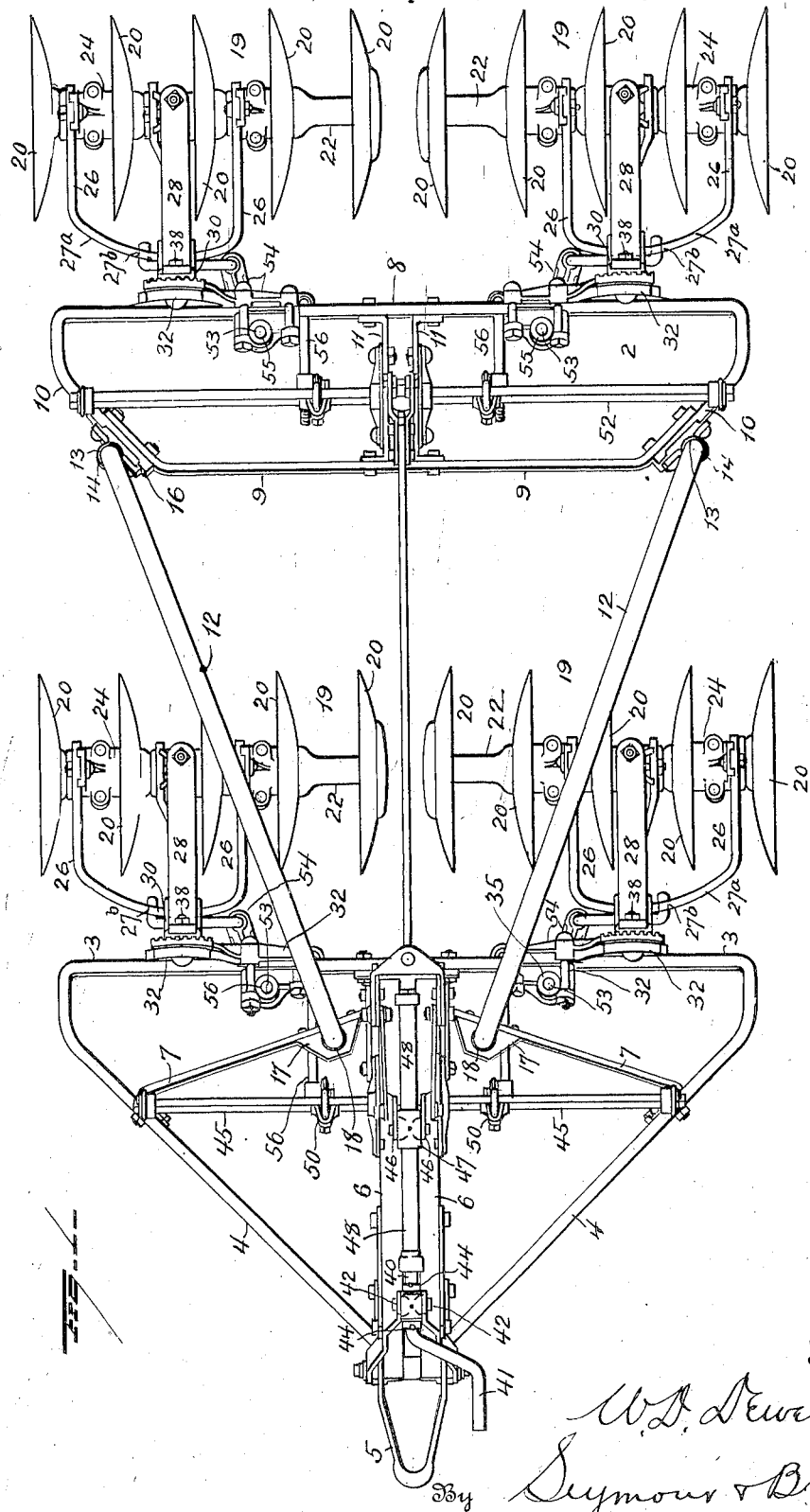
Inventor  
W. D. Dewend  
By Seymour & Bright  
Attorneys

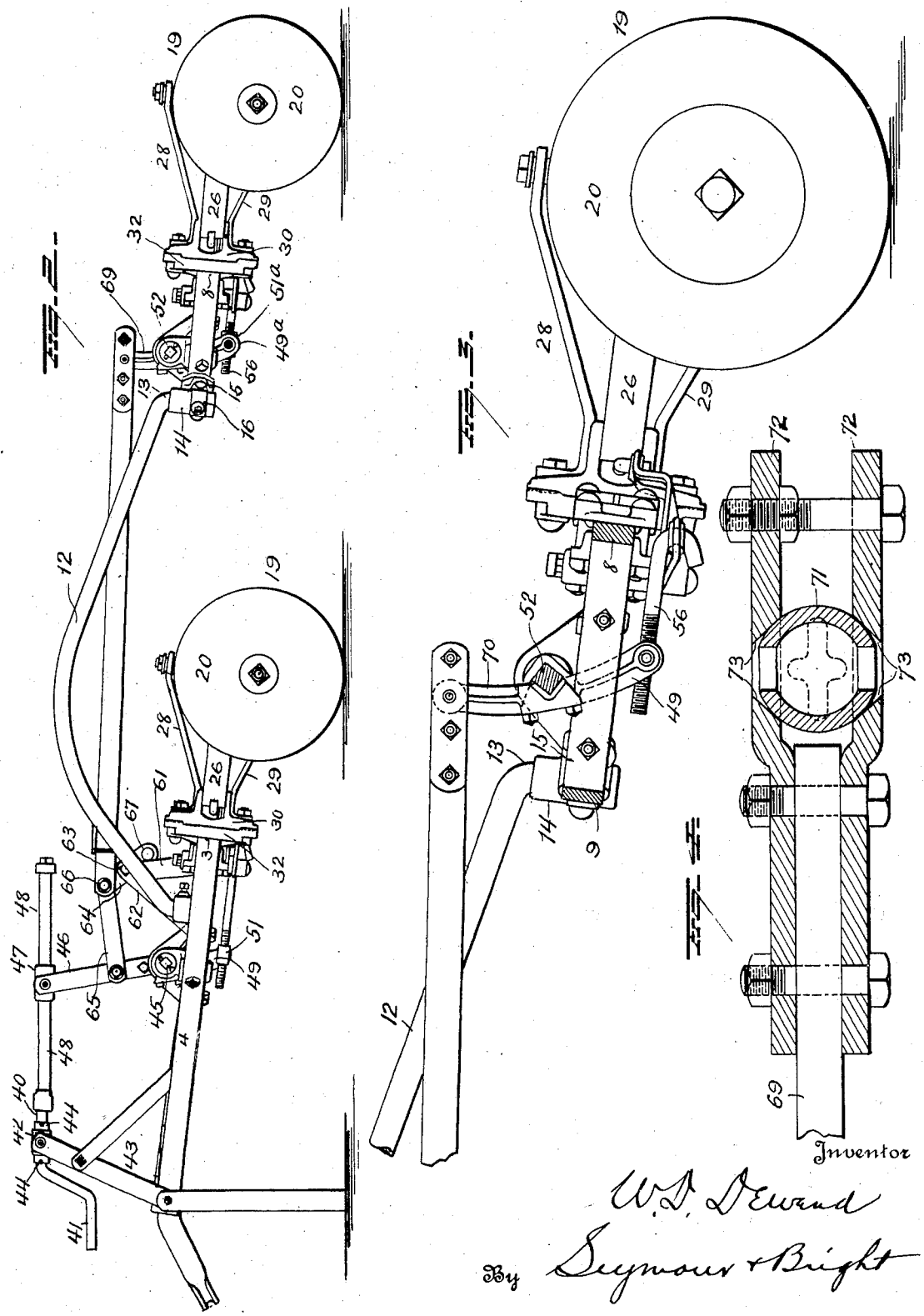

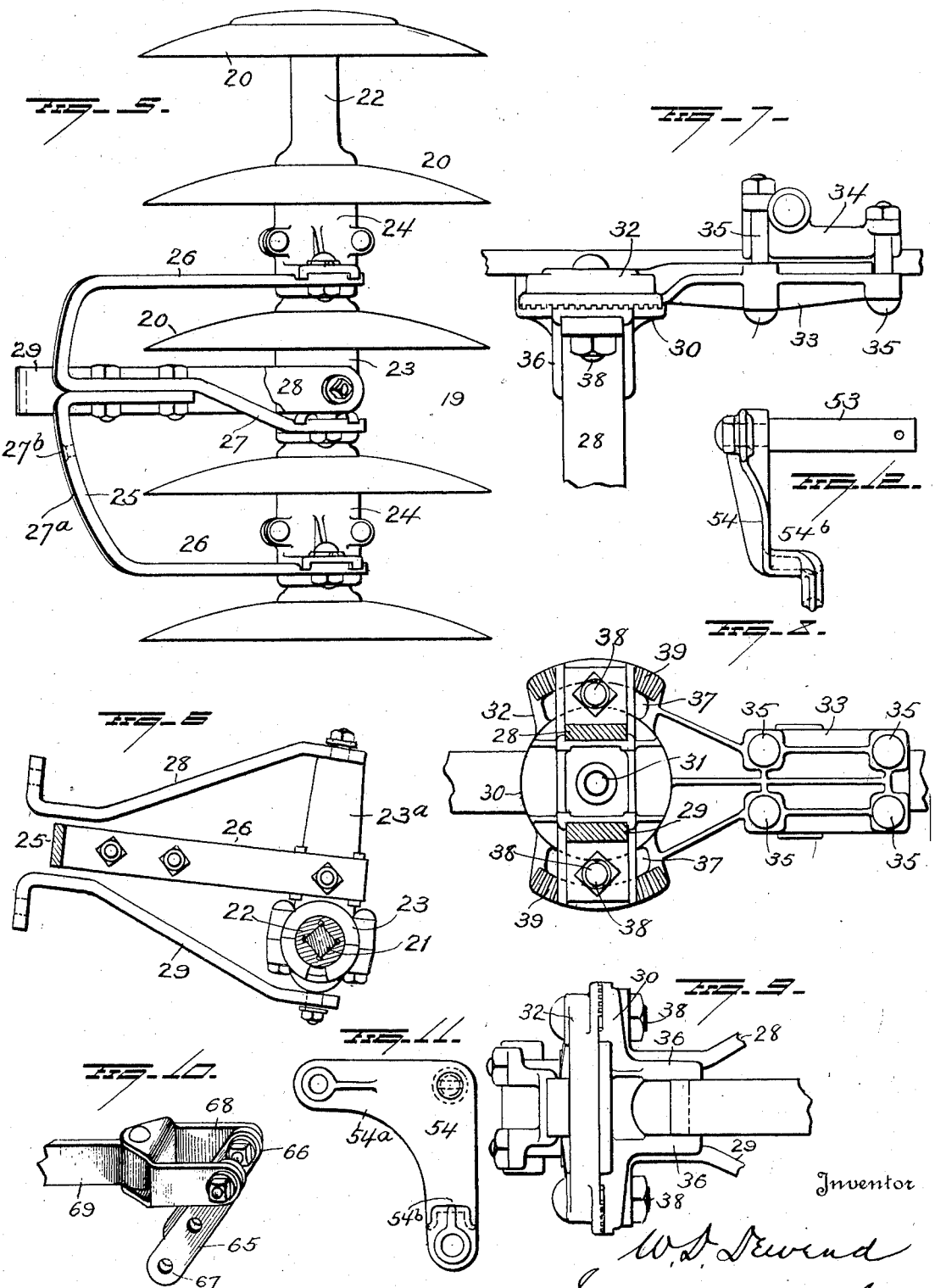

Patented Aug. 18, 1925.

1,550,061

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

DISK HARROW.

Application filed April 15, 1924. Serial No. 706,765.

*To all whom it may concern:*

Be it known that I, WILLIAM D. DEWEND, a citizen of the United States, and resident of South Bend, in the county of Saint Joseph and State of Indiana, have invented certain new and useful Improvements in Disk Harrows, and I do hereby declare the following to be a full, clear, and exact description of the invention, such as will enable others skilled in the art to which it appertains to make and use the same.

This invention relates to improvements in disk harrows,—one object of the invention being to provide an improved construction which will permit ready adjustment and also reversal of the disk gangs.

A further object is to provide a harrow including pivotally connected front and rear frames, and in which means are employed whereby disk gangs shall be adjustably mounted on each frame, and to provide means to hold each gang at a predetermined angle with respect to the line of draft.

A further object is to provide a simple construction between the disk gangs and the frames which will permit of angling the gangs about horizontal axes to accommodate them to inclined sides of ridges, or for forming a ditch or ridge as may be desired.

A further object is to provide an improved yoke construction for each disk gang, which will give great strength to the same as a whole and divide the draft of the gang equally among the bearing members for the disks.

With these and other objects in view, the invention consists in certain novel features of construction and combinations of parts as hereinafter set forth and pointed out in the claims.

In the accompanying drawings; Figure 1 is a plan view of a tandem disk harrow embodying my improvements;

Figure 2 is a side elevation;

Figure 3 is a view partly in side elevation and partly in section showing the rear frame and disk gang attached thereto;

Figure 4 is an enlarged sectional view showing the ball joint connection between the gang shift arm of the rear frame and connecting bar and straps;

Figure 5 is a plan view of a disk gang showing the bearing and yoke construction;

Figure 6 is a sectional view of the same;

Figures 7, 8 and 9 are fragmentary top, side and rear views of the connecting means employed between the frames and disk gangs;

Figure 10 is a detail perspective view showing the universal coupling member 68, and Figures 11 and 12 are detail views showing one of the bell-crank levers 54.

The frame work of the harrow includes a front frame 1 and a rear frame 2,—the former being approximately triangular in form and the latter being elongated transversely of the harrow. The front frame 1 comprises a transversely disposed rear beam member 3; converging beam members 4, from the convergent ends of which, a draft connection 5 projects forwardly; center frame bars or beams 6, 6, and diagonal braces 7 between said center bars or beams and the converging frame beams 4 and secured to both. The rear frame 2 comprises parallel transversely disposed beam members 8—9; end members having diagonal portions 10 and center parallel brace members 11, 11. The front and rear frames 1 and 2 are pivotally connected through the medium of arched connecting bars 12, 12. The rear ends of these bars are provided with depending pintle portions 13 which freely enter sleeve portions 14 of bearing brackets 15. The pintle portions 14 of the connecting bars and the bearing sleeves are of such length as to form rigid connection with the rear frame, while the connecting bars are free to oscillate in their bearings about vertical axes. Set screw collars 16, on the rear pintles of the connecting bars and set in recesses in the sleeve portions of the bearing brackets serve to lock these parts against relative vertical movements. The forward end portions of the connecting bars 12 are mounted in a similar manner in bearing brackets 17 on the diagonal brace bars of the front frame 1, said forward end portions of the connecting bars being provided with collars 18 to engage the bearing brackets 17 and thus cause the weight of the forward portion of the rear frame to be supported.

Disk gangs 19 are connected in pairs with the respective frames 1 and 2. Each disk gang comprises a plurality of earth-working disk blades 20 mounted upon a shaft 21 and spaced by spools such as indicated at 22. A center bearing 23 and two end bearings 24, 24 are mounted upon certain of the spools 22 and are rigidly connected by a yoke 25. As clearly shown in Figure 5, this yoke may be made in two parts rigidly bolted together and so formed as to provide three arms 26, 26 and 27 and an arcuate or curved connecting portion 27ª. The center yoke arm 27 is rigidly secured to the center bearing 23 and the yoke arms 26, 26 are secured to the bearings 24, 24 at respective sides of the center bearing 23. The yoke construction for each disk gang, as above described gives universal strength to the disk gang as a whole and divides the draft of the gang equally among the three bearings. The center bearing 23 of each disk gang unit is provided with a post 23ª, with which the rear end of an upper draw bar 28 is pivotally connected,—the rear end of a lower draw-bar 29 being pivotally connected with said center bearing under the same, as clearly shown in Figure 6. Each pair of draw-bars 28—29 are secured to a bracket 30 and the latter has a center mounting at 31 on a bracket 32. Each bracket 32 includes clamping members 33 and 34 and the brackets 32 are clamped to the rear beams of the frames 1 and 2 respectively, by means of bolts 35. By loosening the nuts on said bolts, the brackets 32 and parts connected therewith may be adjusted laterally on the frame beams to effect certain adjustments of the gang units, as will more fully hereinafter appear. It will be observed that the axes of the pivotal connections between the draw-bars and the disk gangs are of unusual length and very substantial pivotal connections for the disk gangs are afforded which will permit partial rotation of said disk gangs in a horizontal plane. To provide guiding means for the disk gang yokes 25, the brackets 32 are provided with jaws or projections 36 between which the arcuate or curved portions 27ª of said yokes may move.

Each frame bracket 32 is provided above and below its center with curved slots 37, through which bolts 38 pass, said bolts also passing through the adjacent bracket 30 for securing said brackets together and permit adjustment of the bracket 32. The bracket 32 is provided with toothed portions 39 and end portions of the brackets 30 are similarly toothed to mesh with the portions 39 of bracket 32 to insure retention of the bracket 30 in the position to which it may be adjusted. By loosening the nuts 38, the bracket 30 may be turned on their axes 31 and thus each gang unit including the yoke 25 may be turned on a horizontal axis in such manner that the disk gangs may be tilted or adjusted to work in ditches or on ridges.

The angling of the gangs is effected by a manually operable screw shaft 40 through the medium of mechanism which will now be explained: In the present instance, the screw shaft is provided at one end with a crank or handle 41 and is freely mounted near said crank or handle in a sleeve 42 pivotally supported by a standard 43,—longitudinal movement of said screw-shaft being prevented by collars 44 secured thereto. Aligned rock-shaft sections 45, 45 disposed transversely of the front frame are mounted in suitable bearings secured to said frame and to each of said shaft sections, an upwardly projecting arm or lever 46 is secured. A nut 47 is pivotally mounted between the upper end portions of these arms or levers, and through said nut, the threaded portion of the screw shaft 40 passes. Sleeves or tubes 48 project from respective ends of the nut 47 and serve to protect the threaded portion of the screw-shaft and to contain lubricant. Arms 49 are secured to the respective rock shaft sections 45 by means of clamping devices 50, so that said arms may be adjustable on the shaft sections. The arms 49 depend from the rock shaft sections and to their lower portions, internally threaded sleeves or nuts 51 are pivotally connected.

A rock shaft 52 is mounted in suitable bearings secured to the rear frame and may be made in aligning sections if desired. Arms 49ª are adjustably secured to this shaft and depend therefrom and carry pivoted internally threaded sleeves or nuts 51ª. The pintle 53 of a bell-crank lever 54 is mounted in bearings 55 with which the adjustably mounted brackets 32 are provided, so that when said brackets are moved from one position of adjustment to another on the frame 1 or 2 or both, said bell-crank levers will move with them and effect adjustment of the gangs through the medium of devices presently described. The arm 54ª of each bell-crank lever 54 has loosely connected therewith, one end portion of a rod or link 56,— the other end portion of the latter being threaded and passing adjustably through the sleeve or nut 51 (or 51ª) at the lower end of one of the depending arms 49 (or 49ª). The arm 54ᵇ of each bell-crank is connected by a link 60 with the yoke 25 of the adjacent gang unit,—the point of connection of said link with the yoke being indicated at 27ᵇ in Figure 5.

Standards are secured to the rear portions of the center bars 6 of the front frame 1 and each standard may consist of two bars 61, 62 spaced apart at their lower end portions and securely bolted to said center bars, the upper ends of the bars 61, 62 being connected together as indicated at 63. Levers 64 are pivotally connected centrally between their ends with the standard 61—62 at 63, and links 65 connect intermediate portions of the upwardly projecting arms or levers on the shaft sections 45, with the levers 64 at either the upper ends 66 or at the lower ends 67 thereof. A universal coupling member 68 (Fig. 10) is pivotally connected with the upper end portions of the links 65, and with said coupling member, the forward end of a connecting rod 69 is pivotally attached. The rear portion of the connecting rod 69 is connected, by a universal joint, with the upper end of an upwardly projecting arm or lever 70 secured to the rock shaft 52 on the rear frame 2. In effecting the universal joint between the arm 70 and the connecting rod 69, said arm or lever may be provided at its upper end with a spherical head 71 and plates 72 may be secured to the connecting rod and provided with seats 73 for the spherical head 71.

It is apparent that when the screw 40 is operated, motion will be transmitted through the connections above described to the various gang units to angle the latter.

The disks of the gangs may be set for either "out-throw" or "in-throw" or the disks of one pair of gangs may be set for "out-throw" and the disks of the other pair of gangs for "in-throw" as may be desired.

When all the disk gangs are set for "out-throw," as in Figure 1 and the links 65 between the levers 46 and the levers 64 are connected at the upper ends 66 of the latter, the gangs will be simultaneously angled (when the screw shaft 40 is operated) in the same direction, which, when angled from straight or parallel positions would be in a backward direction at the inner ends of the gangs. When all the disks are set "in-throw" and the links 65 are set at 66 at the upper ends of levers 64, an operation of the screw shaft 40 will cause the gangs to be similarly angled, but in this instance the inner ends of the gangs would move forwardly. When the front disk gangs are set at "out-throw," the links 65 may be set at the lower points 67 of the levers 64 and the respective pairs of gangs will, when the screw shaft is operated, be angled in opposite directions.

By moving the frame brackets 32 laterally on the frames, the disk gangs may be spaced greater or less distances apart, and if said brackets be moved from the positions shown in Figure 1 toward the sides of the frames, the bell-crank levers 54 will move with them and they will be turned on their pivoted support so that motion will be imparted, through the medium of the links 56 to the yokes 25 of the disk gang units and the disk gangs will be angled.

Various changes might be made in the details of construction without departing from the spirit of my invention or limiting the scope thereof and hence I do not wish to restrict myself to the precise details herein set forth.

Having fully described my invention what I claim as new and desire to secure by Letters Patent, is:—

1. In an agricultural implement, the combination with a frame and a plurality of pivotally mounted disk gangs, of an adjusting device, connections between said adjusting device and the disk gangs for angling the latter, said connections including selective means whereby operation of the adjusting device in one direction will cause angling of the gangs in one direction or another.

2. In an agricultural implement, the combination with two frames, means connecting said frames, and a pair of pivotally mounted disk gangs connected with each frame, of an adjusting device, connections between said adjusting device and the gangs of both pairs, the connections with the rear gangs including selective means to control direction of angling.

3. In an agricultural implement, the combination with a frame, pivotally mounted disk gangs, and an adjusting device mounted on the frame, of a rock-shaft mounted on the frame, an arm secured to said shaft and connected with said adjusting device, a lever pivotally supported between its ends, a link connected with said arm and adapted to be connected with one or the other arm of said lever, other arms on said rock-shaft, and connections between said last-mentioned arms and the disk gangs to turn the latter on their pivotal mountings when the adjusting device is operated.

4. In an agricultural implement, the combination with a frame, pivotally mounted disk gangs, and an adjusting device mounted on the frame, of a rock-shaft mounted on the frame, an arm secured to said shaft and connected with said adjusting device, a lever pivotally supported between its ends, a link connected with said arm and adapted to be connected with one or the other arm of said lever, other arms on said rock-shaft, and connections between said last-mentioned arms and the disk gangs to turn the latter on their pivotal mountings when the adjusting device is operated, said connections including bell-crank levers connected with the frame.

5. In an agricultural implement, the combination with a frame, pivotally mounted disk gangs, and an adjusting device mounted on the frame of a rock-shaft mounted on the frame, an arm secured to said shaft and connected with said adjusting device, a lever pivotally supported between its ends, a link connected with said arm and adapted to be connected with one or the other arm of said lever, other arms on said rock-shaft, connections between said last-mentioned arms and the disk gangs to turn the later on their pivotal mountings when the adjusting device is operated, said connections including bell-crank levers, and brackets adjustable on the frame and having the bell-crank levers mounted thereon.

6. In an agricultural implement, the combination with front and rear frames, means pivotally connecting said frames, pairs of pivotally mounted disk gangs, means for connecting the respective pairs of disk gangs with the respective frames, and an adjusting device, of brackets adjustable on the respective frames, bell-crank levers carried by said brackets, connections between said bell-crank levers and the pivotally mounted disk gangs, and connections between said adjusting device and all of the bell-crank levers.

7. In an agricultural implement, the combination with front and rear frames, means pivotally connecting said frames, pairs of pivotally mounted disk gangs connected with the respective frames, and an adjusting device mounted on the forward frame, rock shafts mounted on the respective frames, an arm rigid with the rock-shaft on the front frame and connected with said adjusting device, an arm on the rock-shaft on the rear frame, connections between said arms and including a connecting rod and a link, a universal coupling between said rod and link and a universal joint between the rear portion of the connecting rod and the arm on the rock-shaft on the rear frame, and adjustable connections between the respective pairs of pivotally mounted gangs and the respective rock shafts.

In testimony whereof, I have signed this specification.

WILLIAM D. DEWEND.